(12) United States Patent
Choi et al.

(10) Patent No.: US 10,185,654 B2
(45) Date of Patent: Jan. 22, 2019

(54) MEMORY MAPPING MANAGEMENT METHOD FOR NONVOLATILE MAIN MEMORY SYSTEM

(71) Applicant: Samsung Electronics Co., Ltd., Suwon-si, Gyeonggi-do (KR)

(72) Inventors: Jung Sik Choi, Suwon-si (KR); Hwan Soo Han, Seoul (KR); Ji Won Kim, Suwon-si (KR)

(73) Assignees: Samsung Electronics Co., Ltd., Gyeonggi-do (KR); Research & BusinessFoundation Sungkyunkwan University, Gyeonggi-do (KR)

( * ) Notice: Subject to any disclaimer, the term of this patent is extended or adjusted under 35 U.S.C. 154(b) by 5 days.

(21) Appl. No.: 15/365,991

(22) Filed: Dec. 1, 2016

(65) Prior Publication Data
US 2017/0161185 A1 Jun. 8, 2017

(30) Foreign Application Priority Data
Dec. 3, 2015 (KR) .......................... 10-2015-0171500

(51) Int. Cl.
| G06F 12/00 | (2006.01) |
| G06F 12/02 | (2006.01) |
| G06F 12/14 | (2006.01) |

(52) U.S. Cl.
CPC ...... G06F 12/0238 (2013.01); G06F 12/0246 (2013.01); G06F 12/1441 (2013.01);
(Continued)

(58) Field of Classification Search
None
See application file for complete search history.

(56) References Cited

U.S. PATENT DOCUMENTS

| 6,105,103 A | 8/2000 | Courtright, II et al. |
| 6,928,450 B2 | 8/2005 | Mogi et al. |

(Continued)

OTHER PUBLICATIONS

CS 241 Staff, University of Illinois, memory mappings lecture slides, lecture given on Feb. 14, 2014, https://courses.engr.illinois.edu/cs241/sp2014/ (Year: 2014).*

(Continued)

*Primary Examiner* — Prasith Thammavong
*Assistant Examiner* — Jason W Blust
(74) *Attorney, Agent, or Firm* — Harness, Dickey & Pierce, P.L.C.

(57) ABSTRACT

A memory mapping management method for a system using nonvolatile memory (NVM) as main memory, including receiving a request to cancel a memory mapping, determining whether the memory mapping is a mapping of a file based on meta data relating to the memory mapping, separately storing the meta data when the memory mapping is the mapping of the file, and cancelling the memory mapping when the memory mapping is not the mapping of the file may be provided. Further, the memory mapping management method may include receiving a memory mapping request, searching for a memory mapping for a file in a memory mapping storage space when a requested memory mapping is a mapping of the file, and reusing a searched memory mapping found during the search when a region of the searched memory mapping includes a region required by the requested memory mapping in a virtual address space.

20 Claims, 15 Drawing Sheets

(52) U.S. Cl.
CPC ............. *G06F 2212/202* (2013.01); *G06F 2212/7201* (2013.01); *G06F 2212/7207* (2013.01)

(56) References Cited

U.S. PATENT DOCUMENTS

| | | | |
|---|---|---|---|
| 6,944,711 B2 | 9/2005 | Mogi et al. | |
| 7,065,630 B1* | 6/2006 | Ledebohm | G06F 12/1081 710/8 |
| 7,421,562 B2 | 9/2008 | Bhatt et al. | |
| 2003/0204664 A1 | 10/2003 | Bennett | |
| 2010/0268900 A1 | 10/2010 | van Riel | |
| 2013/0297886 A1 | 11/2013 | Hyde, II et al. | |
| 2014/0297998 A1 | 10/2014 | Kang | |
| 2015/0293701 A1* | 10/2015 | Kim | G06F 3/061 710/5 |
| 2016/0139828 A1* | 5/2016 | Yan | G06F 3/0616 711/103 |
| 2016/0210044 A1* | 7/2016 | Mitkar | G06F 3/061 |

OTHER PUBLICATIONS

Duarte, How the Kernal Manages Your Memory, Many But Infinite, https://manybutfinite.com/post/how-the-kernel-manages-your-memory, posted Feb. 4, 2009 (Year: 2009).*

Arkaprava Basu et al. "Efficient Virtual Memory for Big Memory Servers". University of Wisconsin-Madison and Hewlett-Packard Laboratories. ISCA'13 Tel-Aviv. (2013). p. 1-12.

Juan Navarro et al. "Practical, transparent operating system support for superpages". Rice University and Proc. of the 5th Usenix Symposium on Operating Systems Design and Implementation. (Dec. 2002). p. 1-16.

Subramanya R. Dulloor et al. "System Software for Persistent Memory". Intel Labs, Intel Corp., Georgia Institute of Technology, and EuroSys. (2014). p. 1-14.

Thomas W. Barr et al. "Translation Caching: Skip, Don't Walk (the Page Table)". Rice University and ISCA'10. (Jun. 2010). p. 1-12.

* cited by examiner

FIG. 7

```
struct vm_area_struct{
        unsigned long vm_start;   /* start address in virtual memory space */
        unsigned long vm_end;     /* end address in virtual memory space */
            ⋮
        pgprot_t vm_page_prot;    /* access right */
        struct   rb_node vm_rb;   /* variable representing position in data
                                     structure managed by os */
            ⋮
        struct   file * vm_file;  /* mapping of file or not */
            ⋮
        struct  list_head free_list;  /* position in free list */
        struct  hlist_node hlist;     /* position in hash table */
            ⋮
        char    *file_path;       /* file location */
};
```

MEMORY MAPPING MANAGEMENT METHOD FOR NONVOLATILE MAIN MEMORY SYSTEM

CROSS-REFERENCE TO RELATED APPLICATIONS

This application claims priority under 35 U.S.C. § 119(a) to Korean Patent Application No. 10-2015-0171500 filed on Dec. 3, 2015, the disclosure of which is hereby incorporated by reference in its entirety.

BACKGROUND

Example embodiments of the inventive concepts relate to memory mapping management methods for a nonvolatile main memory system, and more particularly, to memory mapping management methods for a nonvolatile main memory system which reuses a memory mapping generated during file input/output.

Research has been conducted to use nonvolatile memory as main memory of a computer system. As one example of such research, file input/output using a memory mapping has been introduced. File input/output using a memory mapping provides relatively high performance as compared to a general file input/output. In other words, file input/output using memory mapping enables a large file to be processed at a higher speed, uses relatively simple program codes, and facilitates maintenance.

However, the file input/output using memory mapping incurs great expense of time and labor to create a memory mapping between a frame of a file and a page of a process when a page fault occurs. Furthermore, the memory mapping is erased when the file input/output using the memory mapping ends. To overcome these problems, an approach for efficiently using a memory mapping that has been generated is desired.

SUMMARY

According to an example embodiment of the inventive concepts, a memory mapping management method for a nonvolatile main memory system includes receiving a request to cancel a memory mapping, determining whether the memory mapping is a mapping of a file based on meta data relating to the memory mapping, separately storing the meta data when the memory mapping is the mapping of the file, and cancelling the memory mapping when the memory mapping is not the mapping of the file.

According to an example embodiment of the inventive concepts, a memory mapping management method for a nonvolatile main memory system, which uses nonvolatile memory as main memory, includes receiving a memory mapping request, searching for a memory mapping for a file in a memory mapping storage space when a requested memory mapping is a mapping of the file, and reusing a searched memory mapping found during the search when a region of the searched memory mapping includes a region required by the requested memory mapping in a virtual address space.

According to an example embodiment of the inventive concepts, a memory mapping management method for a nonvolatile main memory system, which uses nonvolatile memory as main memory, includes a first management operation and a second management operation. The first management operation includes receiving a memory mapping request, accessing a memory mapping for a file in a memory mapping storage space when a requested memory mapping is a mapping of the file, and reusing the accessed memory mapping when a region of the accessed memory mapping includes a region required by the requested memory mapping in a virtual address space. The second management operation includes receiving a request to cancel a memory mapping, determining whether the memory mapping is a mapping of a file based on meta data relating to the memory mapping, separately storing the meta data to have a first data structure and a second data structure when the memory mapping is the mapping of the file, and cancelling the memory mapping when the memory mapping is not the mapping of the file.

BRIEF DESCRIPTION OF THE DRAWINGS

The above and other features and advantages of the inventive concepts will become more apparent by describing in detail example embodiments thereof with reference to the attached drawings in which:

FIG. 7 is a diagram of meta data relating to a memory mapping;

DETAILED DESCRIPTION

With the recent development of manufacturing processes for producing semiconductor memory, functions of the semiconductor memory have been rapidly improved. For example, nonvolatile memory has reached a level of replacing existing volatile main memory or sub memory in terms of performance indices such as read latency, write latency, addressability, and/or endurance.

Hereinafter, the description will be made based on the premise that systems according to some example embodiments of the inventive concepts have the following technical features, which reflects technical developments in nonvolatile memory. Firstly, systems according to some example embodiments of the inventive concepts include a main memory formed of nonvolatile memory instead of volatile memory. Here, the nonvolatile memory may include persistent memory. Secondly, the nonvolatile main memory functions as sub memory and is thus able to store a file system therein.

Figure 1:
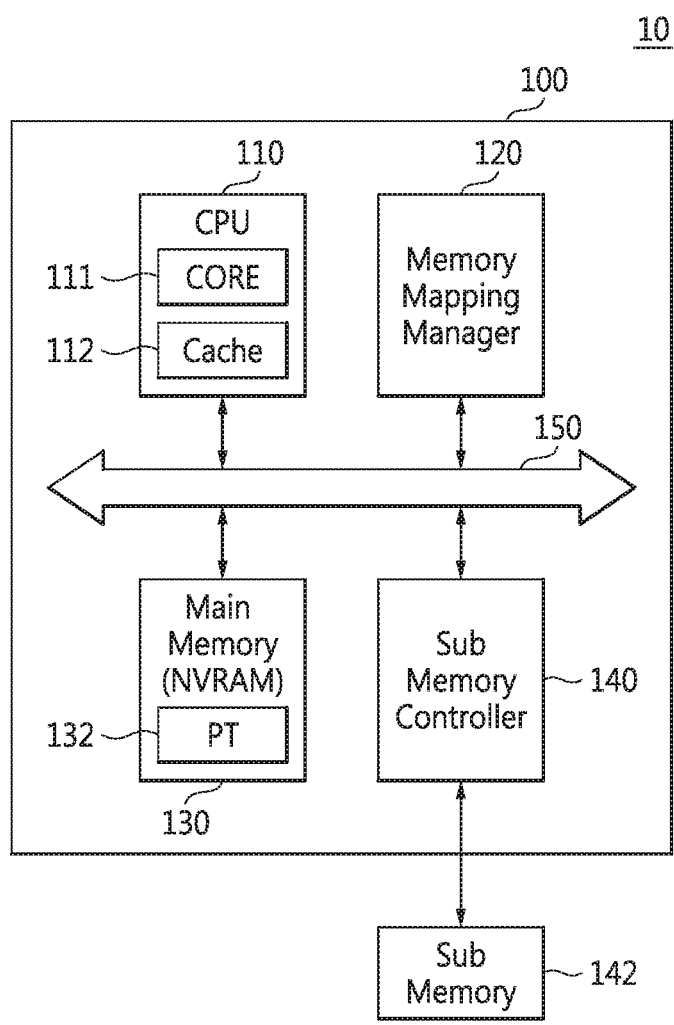
FIG. 1 is a block diagram of a nonvolatile main memory system according to an example embodiment of the inventive concepts.

FIG. 1 is a block diagram of a nonvolatile main memory system 10 according to an example embodiment of the inventive concepts. The nonvolatile main memory system 10 may include a computing system 100 and a sub memory 142.

The computing system 100 may include a central processing unit (CPU) 110, a memory mapping manager 120, a nonvolatile main memory 130, a sub memory controller 140, and a bus 150. The CPU 110 may include at least one core 111 and a cache 112. The nonvolatile main memory 130 may include a page table (PT) 132.

The CPU 110 may control the overall operation of the nonvolatile main memory system 10 under the control of an operating system (OS). The CPU 110 may use the core 111 and the cache 112 to control the overall operation of the nonvolatile main memory system 10.

The CPU 110 may control the overall operation of the nonvolatile main memory system 10 to generate a memory mapping between pages of virtual memory and frames of physical memory. Here, the pages may be blocks of certain size into which a storage space of the virtual memory is divided and the frames may be blocks of certain size into which a storage space of the physical memory is divided. The physical memory may be the nonvolatile main memory 130.

The CPU 110 may store a result of the memory mapping between the pages and the frames in the PT 132. The CPU 110 may input a new memory mapping result to the PT 132 or may erase the existing memory mapping result from the PT 132.

The CPU 110 may also perform file input/output (I/O). In addition, the CPU 110 may perform memory mapped file I/O using the memory mapping. When the CPU 110 performs file I/O using memory mapping, memory copy overhead brought by general file I/O can be avoided and a file can be directly accessed without a help of other hardware and/or software component(s).

The nonvolatile main memory 130 may include electrically erasable programmable read-only memory (EEPROM), flash memory, magnetic random access memory (MRAM), spin-transfer torque MRAM, ferroelectric RAM (FeRAM), phase-change RAM (PRAM), resistive RAM (RRAM), nanotube RRAM, polymer RAM, nano floating gate memory (NFGM), holographic memory, molecular electronics memory device, or insulator resistance change memory. However, the inventive concepts are not restricted to these examples. The nonvolatile main memory 130 may include persistent memory which retains data even when power is off. The PT 132 included in the nonvolatile main memory 130 may store a result of memory mapping between virtual memory and physical memory.

The sub memory controller 140 may control a data access operation, e.g., a write operation or a read operation, of the sub memory 142 according to the control of the CPU 110. The sub memory controller 140 may be implemented in a chip separated from the CPU 110 or may be implemented as a part of the CPU 110. The sub memory 142 extends the functions of the nonvolatile main memory 130 to permanently preserve a large amount of data.

The computing system 100 may be implemented as a personal computer (PC) or a mobile device, such as a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book, but the inventive concepts are not restricted to these examples.

The components 110, 111, 112, 120, 130, 132, and 140 of the computing system 100 may communicate data with one another through the bus 150. The bus 150 may be implemented as advanced microcontroller bus architecture (AMBA), an advanced high-performance bus (AHB), an advanced system bus (ASB), advanced extensible interface (AXI) coherency extensions (ACE), or a combination thereof, but the inventive concept is not restricted to these examples. The structure and functions of the memory mapping manager 120 will be described in detail with reference to FIG. 5 later.

Figure 2:
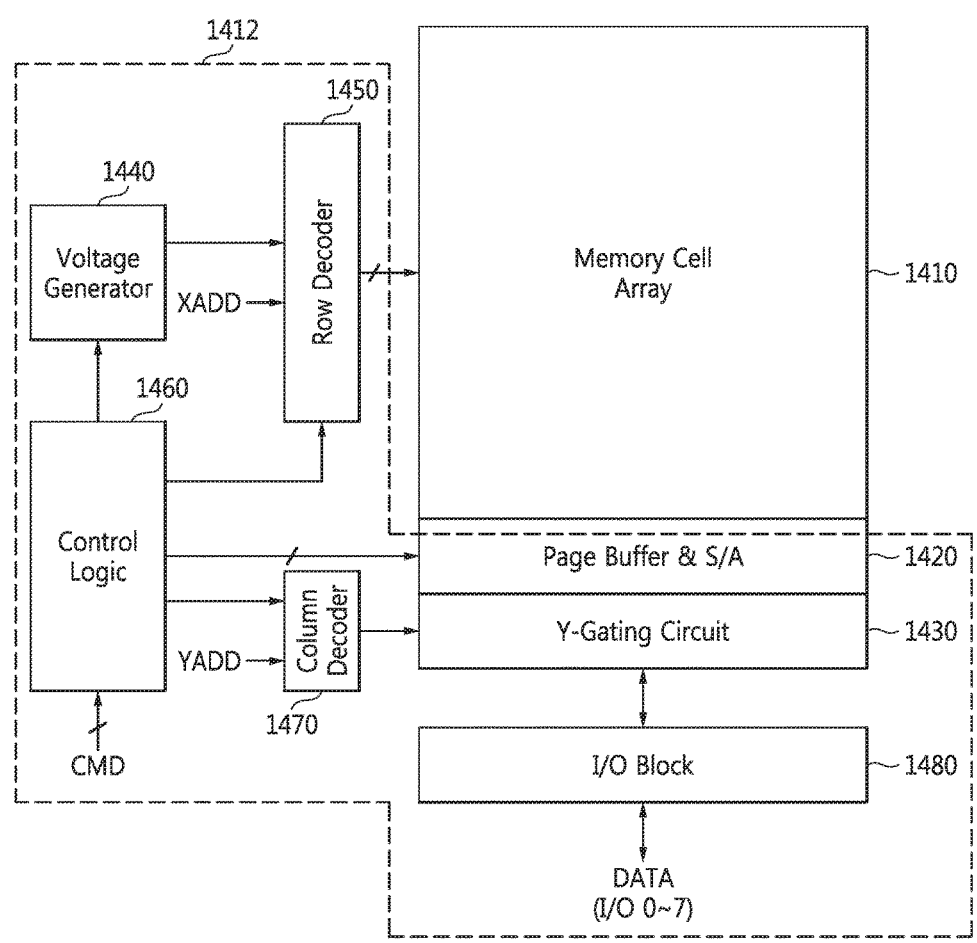
FIG. 2 is a detailed diagram of a nonvolatile main memory device according to an example embodiment of the inventive concepts.
Figure 3:
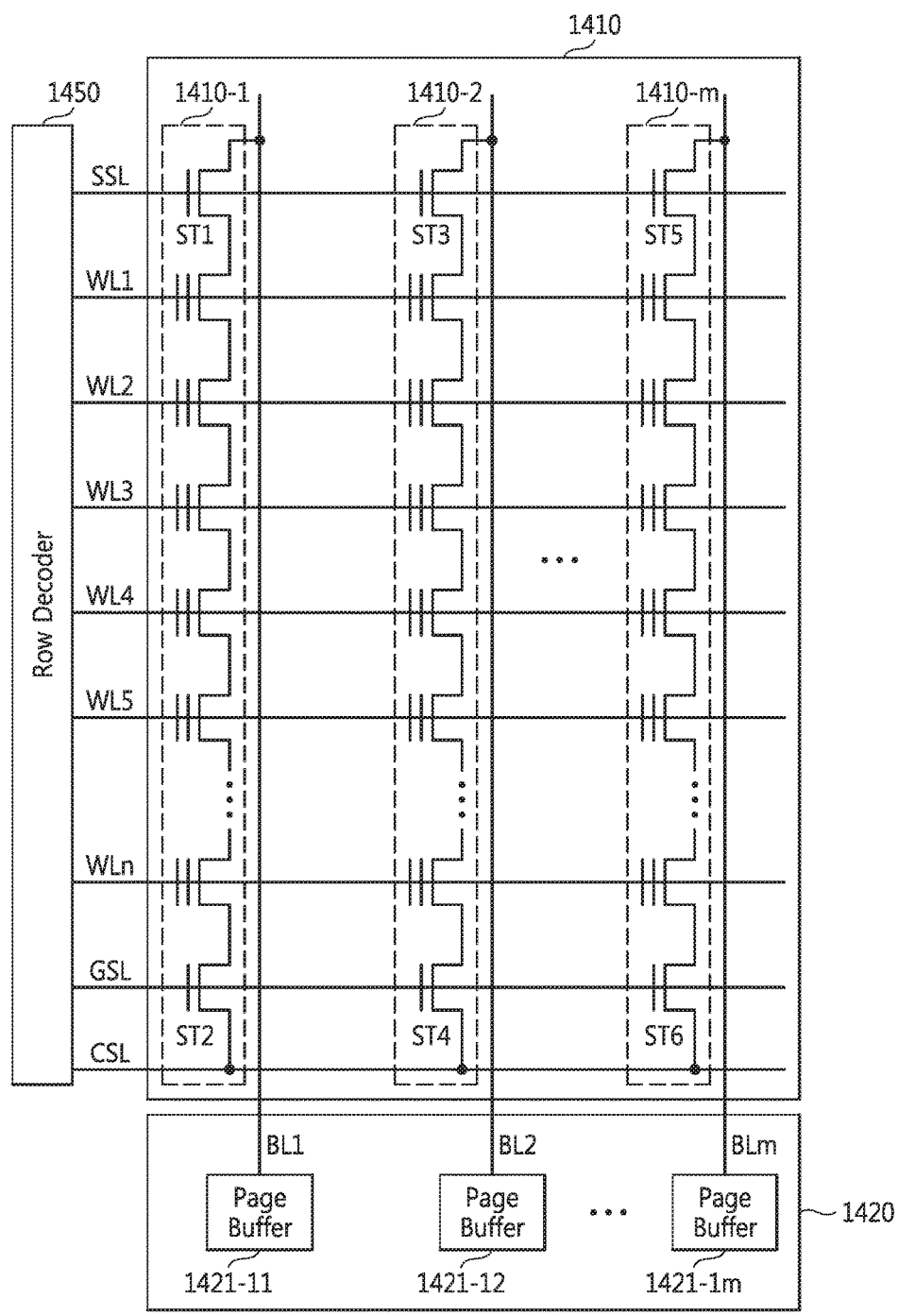
FIG. 3 is a detailed diagram of a memory cell array illustrated in FIG. 2 according to an example embodiment of the inventive concepts.
Figure 4:
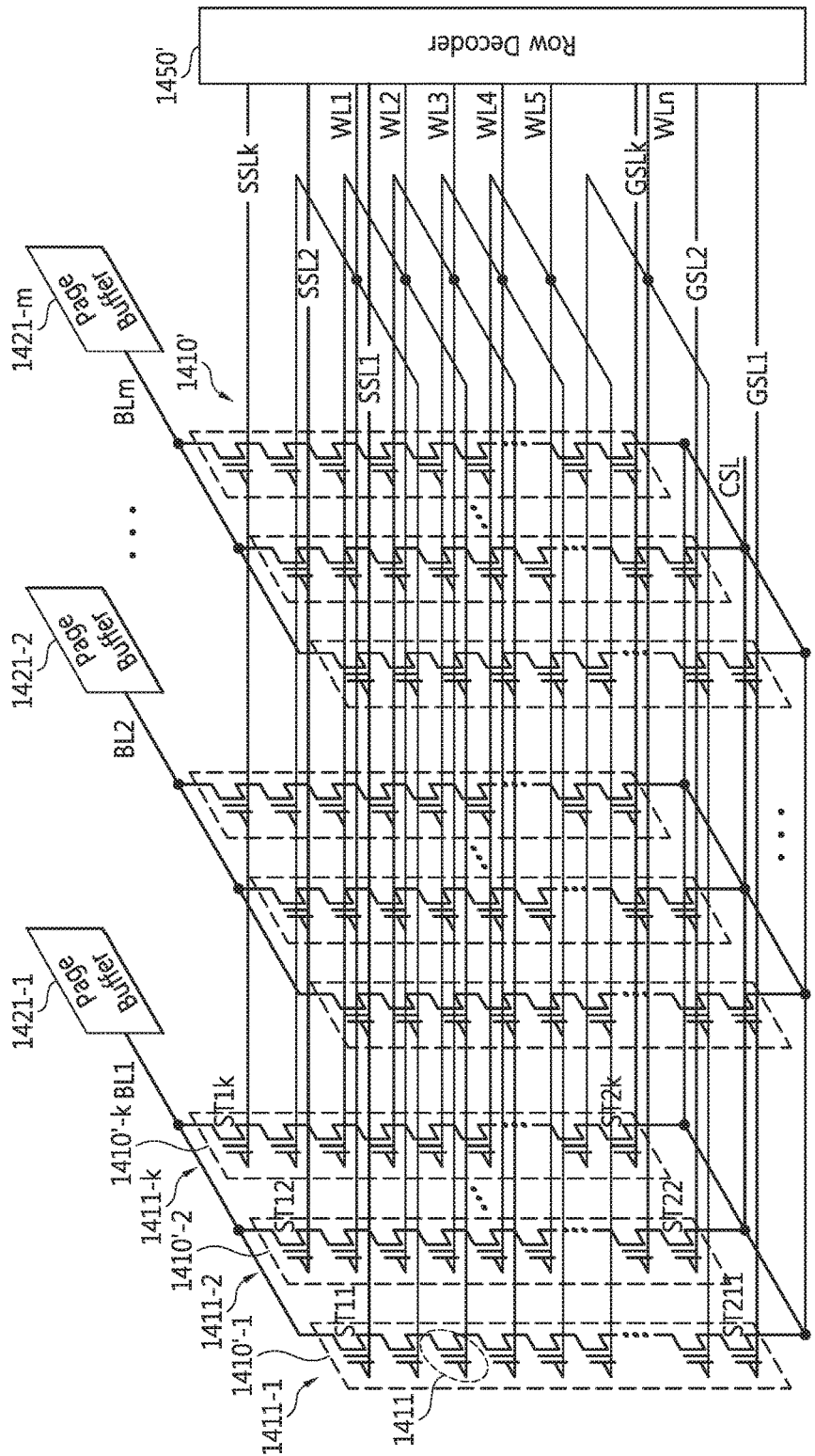
FIG. 4 is a detailed diagram of the memory cell array illustrated in FIG. 2 according to an example embodiment of the inventive concepts.

FIG. 2 is a block diagram of a nonvolatile main memory 130-1 formed of NAND flash memory according to an example embodiment of the inventive concepts. FIG. 3 is a detailed diagram of a memory cell array 1410 illustrated in FIG. 2 according to an example embodiment of the inventive concepts. FIG. 4 is a detailed diagram of the memory cell array 1410 illustrated in FIG. 2 according to an example embodiment of the inventive concepts.

Referring to FIG. 2, the nonvolatile main memory 130-1 may include the memory cell array 1410 and an access circuit 1412. The memory cell array 1410 includes NAND memory cell strings respectively connected to bit lines. Each of the NAND memory cell strings includes a plurality of nonvolatile memory cells connected in series to one another.

Each NAND memory cell string may be laid out (or embodied) on one plane (or layer) in two dimensions as illustrated in FIG. 3. Alternatively, the memory cell array 1410 may be implemented in three dimensions, as illustrated in FIG. 4, using a wafer stack, a chip stack, or a cell stack.

Referring to FIGS. 3 and 4, the NAND memory cell string may include the nonvolatile memory cells connected in series between a string selection transistor ST1 connected to one of the bit lines and a ground selection transistor ST2 connected to a common source line (CSL). A gate of the string selection transistor ST1 may be connected to a string selection line (SSL). Gates of the respective nonvolatile memory cells may be connected to a plurality of word lines, respectively. A gate of the ground selection transistor ST2 may be connected to a ground selection line (GSL). The NAND memory cell strings may be connected to page buffers 1421-1*l* through 1421-1*m* in FIG. 3 or 1421-1 through 1421-*m* in FIG. 4, respectively. At this time, the number of word lines may vary depending on example embodiments.

The three-dimensional (3D) memory cell array may be monolithically formed at one or more physical levels in an array of memory cells having an active region disposed on or above a silicon substrate and may include a circuit related with the operation of the memory cells. The circuit may be formed in, on or above the silicon substrate. The term "monolithic" means that layers at each level in an array are directly deposited on layers at an underlying level in the array. The three-dimensional memory cell array may include a vertical NAND string which is vertically oriented so that at least one memory cell is placed on or above another memory cell. The at least one memory cell may include a charge trap layer. The following patent documents, which are hereby incorporated by reference, describe suitable 3D memory cell array configurations, in which the 3D memory cell array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The access circuit 1412 may access the memory cell array 1410 to perform a data access operation, for example, a program operation, a read operation, or an erase operation, according to a command (or a set of commands) and an address received from an outside, the CPU 110. The access circuit 1412 may include a voltage generator 1440, a row decoder 1450, a control logic 1460, a column decoder 1470, a page buffer and sense amplifier (S/A) block 1420, a Y-gating circuit 1430, and an I/O block 1480.

The voltage generator 1440 may generate a voltage for a data access operation in response to a control code generated by the control logic 1460. The voltage generator 1440 may generate a program voltage and a program-verify voltage to perform a program operation, read voltages to perform a read operation, and an erase voltage and an erase-verify voltage to perform an erase operation and may output the voltages for each of the operations to the row decoder 1450.

The control logic 1460 may control the overall operation of the access circuit 1412 in response to a command CMD output from the CPU 110. The control logic 1460 may control memory read state information to be sensed during a memory read operation and data that has been read to be output to the CPU 110.

Under the control of the control logic 1460, the column decoder 1470 may decode a column address YADD and output a plurality of select signals to the Y-gating circuit 1430.

The page buffer and S/A block 1420 may include a plurality of page buffers PB. The page buffers PB may be connected to the bit lines, respectively.

The page buffers PB may operate as drivers that temporarily store data read from the memory cell array 1410 in the read operation according to the control of the control logic 1460. Each of the page buffers PB may also operate as an S/A which senses and amplifies a voltage of each bit line during the read operation according to the control of the control logic 1460.

The Y-gating circuit 1430 may control transmission of data between the page buffer and S/A block 1420 and the I/O block 1480 in response to the select signals received from the column decoder 1470.

The I/O block 1480 may transmit data from an outside to the Y-gating circuit 1430 or transmit data from the Y-gating circuit 1430 to the CPU 110 through a plurality of I/O pins (or a data bus).

Figure 5:
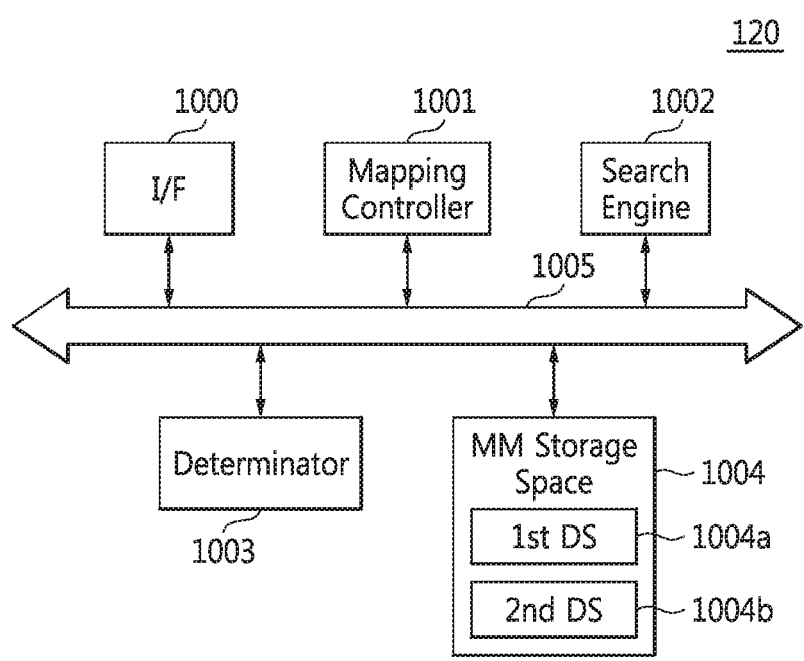
FIG. 5 is a block diagram of the structure of components included in a memory mapping manager illustrated in FIG. 1.

FIG. 5 is a block diagram of the structure of components included in the memory mapping manager 120 illustrated in FIG. 1. Referring to FIGS. 1 and 5, the memory mapping manager 120 may include an interface (I/F) 1000, a mapping controller 1001, a search engine 1002, a determinator 1003, a memory mapping storage space 1004, and a bus 1005 as the components. The memory mapping storage space 1004 may include a first data structure space 1004*a* and a second data structure space 1004*b*. The components 1000, 1001, 1002, 1003, 1004, 1004*a*, 1004*b*, and 1005 may manage memory mapping of a nonvolatile main memory system according to some example embodiments of the inventive concepts.

The I/F 1000 may receive, for example, a memory mapping request or a memory mapping cancellation request from the CPU 110. The memory mapping request or the memory mapping cancellation request may be a system call which enables a process to use the function of a kernel of an OS. The memory mapping request or the memory mapping cancellation request may include arguments. The arguments included in the memory mapping request may include address information of a virtual memory space to be allocated, information about the size, the right and the mode of a memory mapping, a descriptor of a target file of the memory mapping, and an offset value for starting the memory mapping in the descriptor. The arguments included in the memory mapping cancellation request may include information about a start address of a virtual memory space that has been subjected to a memory mapping and the size of the memory mapping.

The I/F 1000 may send a search request for meta data relating to a memory mapping to the CPU 110 and may receive the meta data from the CPU 110 under the control of the mapping controller 1001. Some example embodiments relating to the memory mapping request, the memory mapping cancellation request, and the meta data will be described in detail with reference to FIGS. 6 and 10 later.

The mapping controller 1001 may control each component included in the memory mapping manager 120. The mapping controller 1001 may transmit arguments included in the memory mapping request and the memory mapping cancellation request, which are received through the I/F 1000, to each component included in the memory mapping manager 120. At this time, the mapping controller 1001 may send the CPU 110 a request to reserve the operation involved in the memory mapping request or the memory mapping cancellation request until execution of some example embodiments of the inventive concepts according to the requests is terminated.

The mapping controller 1001 may generate a memory mapping and store it in the memory mapping storage space 1004 or may cancel the memory mapping stored in the memory mapping storage space 1004. Further, the mapping controller 1001 may update or revise the memory mapping stored in the memory mapping storage space 1004.

The search engine 1002 may search a memory mapping stored in the memory mapping storage space 1004 under the control of the mapping controller 1001. At this time, the search engine 1002 may use a first data structure. The search engine 1002 may cancel a memory mapping stored in the memory mapping storage space 1004 under the control of the mapping controller 1001. At this time, the search engine 1002 may use a second data structure. The first data structure may be a hash table and the second data structure may be a free list. The first data structure and the second data structure will be described in detail with reference to FIGS. 8 and 9 later.

The determinator 1003 may determine whether a memory mapping corresponding to a memory mapping request or a memory mapping cancellation request is a mapping of a file. The determinator 1003 may determine whether the memory mapping requested is the mapping of a file based on one of arguments included in the memory mapping request. The determinator 1003 may also determine whether the memory mapping to be cancelled is the mapping of a file based on meta data transmitted in response to the memory mapping cancellation request.

The determinator 1003 may also determine whether a region of a memory mapping in a virtual address space searched for in the memory mapping storage space 1004 by the search engine 1002 includes a region in the virtual address space requested by a memory mapping. The region of the searched memory mapping in the virtual address space may be determined using a structure member included in meta data relating to the searched memory mapping. The region required by the requested memory mapping in the virtual address space may be determined using arguments included in the memory mapping request.

The memory mapping storage space 1004 may store a memory mapping under the control of the mapping controller 1001.

The components 1000, 1001, 1002, 1003, 1004, 1004*a*, and 1004*b* of the memory mapping manager 120 may communicate data with one another through the bus 1005. The operations and functions of the memory mapping manager 120 and its components 1000, 1001, 1002, 1003, 1004, 1004*a*, and 1004*b* will be described in detail with reference to FIGS. 6 through 11 later.

The memory mapping manager 120 and its components 1000, 1001, 1002, 1003, 1004, 1004*a*, and 1004*b* may be implemented as hardware components. The I/F 1000, the mapping controller 1001, the search engine 1002, the determinator 1003, the memory mapping storage space 1004, and the bus 1005 may be implemented inside the computing system 100. For example, the components may be implemented as parts of the CPU 110 or may be implemented in a chip or chips separated from the CPU 110. When the components are implemented in a chip or chips separated from the CPU 110, the components may be implemented inside a memory management unit (MMU) (not shown). The first data structure space 1004*a* and the second data structure space 1004*b* may be stored in the cache 112.

In some example embodiments, the memory mapping manager 120 and its components 1000, 1001, 1002, 1003, 1004, 1004*a*, and 1004*b* may be implemented as software components. For example, the I/F 1000, the mapping controller 1001, the search engine 1002, the determinator 1003, the memory mapping storage space 1004, and the bus 1005 may be stored in the nonvolatile main memory 130 and executed by an OS.

Figure 6:
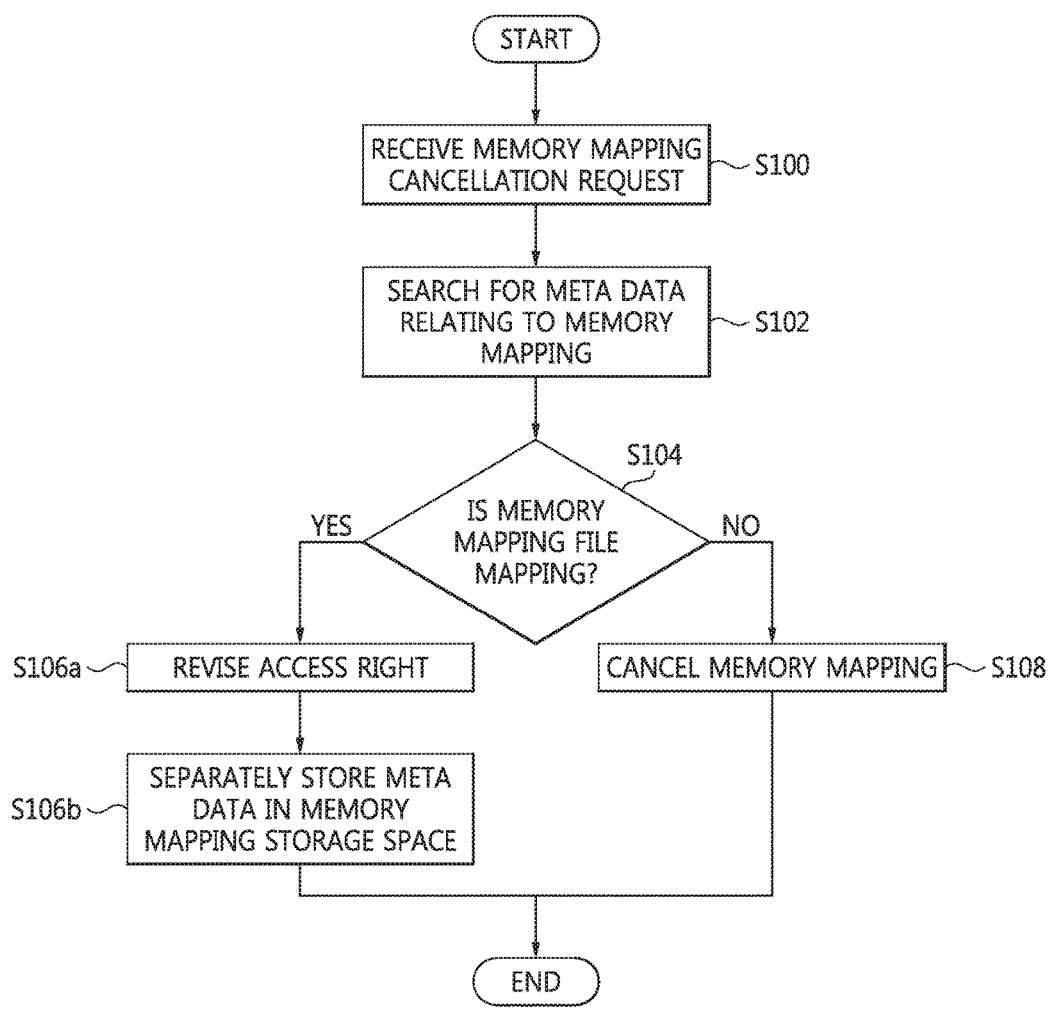
FIG. 6 is a flowchart of a memory mapping management method for a nonvolatile main memory system when there is a memory mapping cancellation request according to an example embodiment of the inventive concepts.

FIG. 6 is a flowchart of a memory mapping management method for the nonvolatile main memory system 10 when there is a memory mapping cancellation request according to an example embodiment of the inventive concepts. Referring to FIGS. 1 through 6, the memory mapping cancellation request may be received in operation S100. The memory mapping cancellation request is a system call by a process and may be received by the I/F 1000. The I/F 1000 may receive the memory mapping cancellation request from the CPU 110. The memory mapping cancellation request may include arguments which may include information about a start address of a virtual memory space that has been subjected to a memory mapping and the size of the memory mapping.

Thereafter, meta data relating to the memory mapping whose cancellation has been requested may be searched for in operation S102. The search of the meta data may be performed by the CPU 110 at the request of the mapping controller 1001. The request of the mapping controller 1001 may be transmitted to the CPU 110 through the I/F 1000. The meta data will be described in detail with reference to FIG. 7.

FIG. 7 is a diagram of the meta data relating to the memory mapping. The meta data may be a data structure provided by the OS for the management of virtual memory. The meta data may include a structure and structure members. The start address of the virtual memory space that has been subjected to a memory mapping may be included as a structure member. The search of the meta data relating to the memory mapping whose cancellation has been requested may be performed by comparing the argument included in the memory mapping cancellation request with the structure members included in the meta data relating to the memory mapping. The searched meta data may be a set of meta data having a structure member which coincides with the start address of the virtual memory space that has been subjected to a memory mapping and included in the argument.

Referring back to FIGS. 1 through 6, the CPU 110 may transmit the meta data that have been searched for in operation S102 to the mapping controller 1001 through the I/F 1000. The mapping controller 1001 may transmit the meta data to the determinator 1003. Thereafter, whether the memory mapping whose cancellation has been requested is a mapping of a file may be determined in operation S104. The determination may be performed by the determinator 1003. Referring to FIG. 7, the determinator 1003 may determine whether the memory mapping whose cancellation has been requested is the mapping of a file based on a structure member including information about the mapping of a file among structure members of the meta data transmitted by the mapping controller 1001.

When it is determined that the memory mapping is the mapping of a file (i.e., in case of YES) in operation S104, an access right to the meta data relating to the memory mapping may be revised in operation S106*a* and the meta data relating to the memory mapping may be separately stored in the memory mapping storage space 1004 in operation S106*b*.

The revision of the access right may be performed by the mapping controller 1001 in operation S106*a*. Referring to FIG. 7, the mapping controller 1001 may revise a structure member representing the access right among the structure members of the meta data relating the memory mapping. The revised access right may be for read-only.

The storing of the meta data may be performed by the mapping controller 1001 in operation S106*b*. The mapping controller 1001 may separately store the meta data relating to the memory mapping in the memory mapping storage space 1004. The meta data stored in the memory mapping storage space 1004 may be managed using a first data structure and a second data structure, which will be described in detail with reference to FIGS. 8 and 9.

Figure 8:
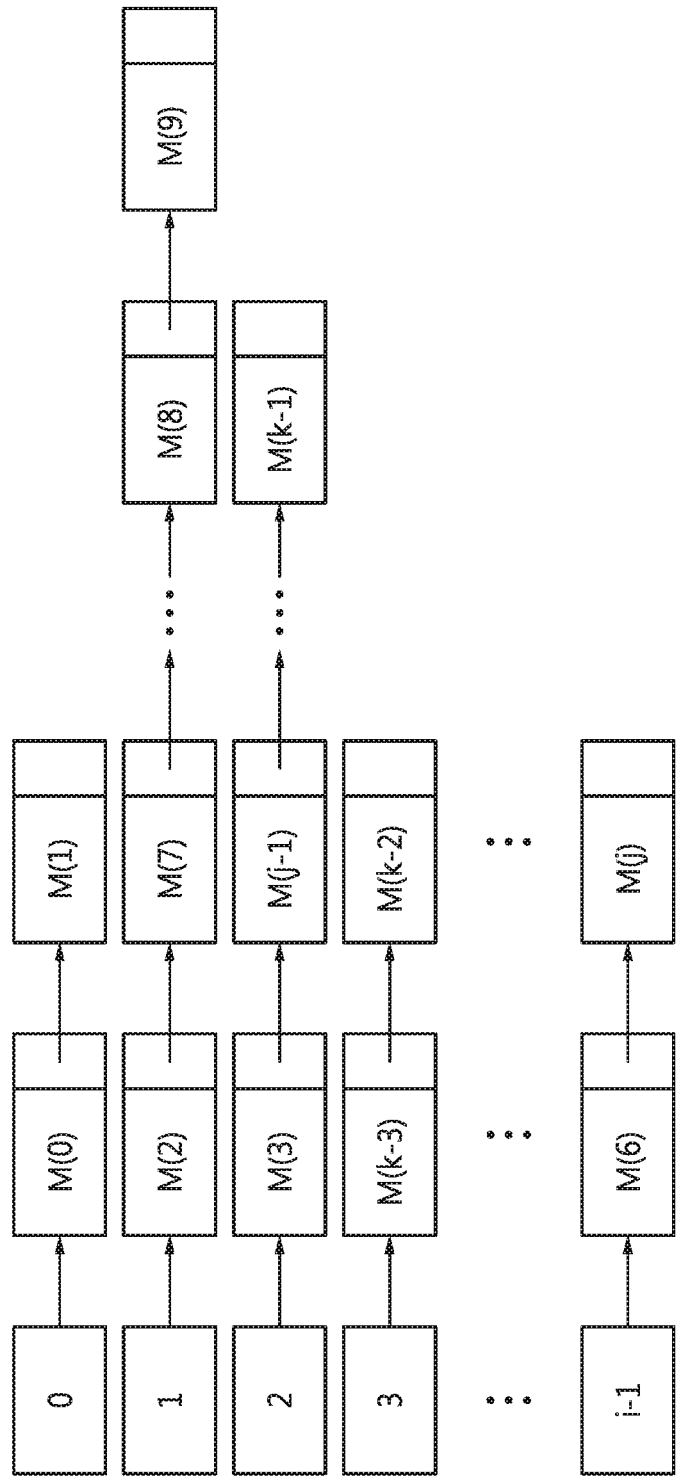
FIG. 8 is a diagram of a first data structure for managing meta data.
Figure 9:
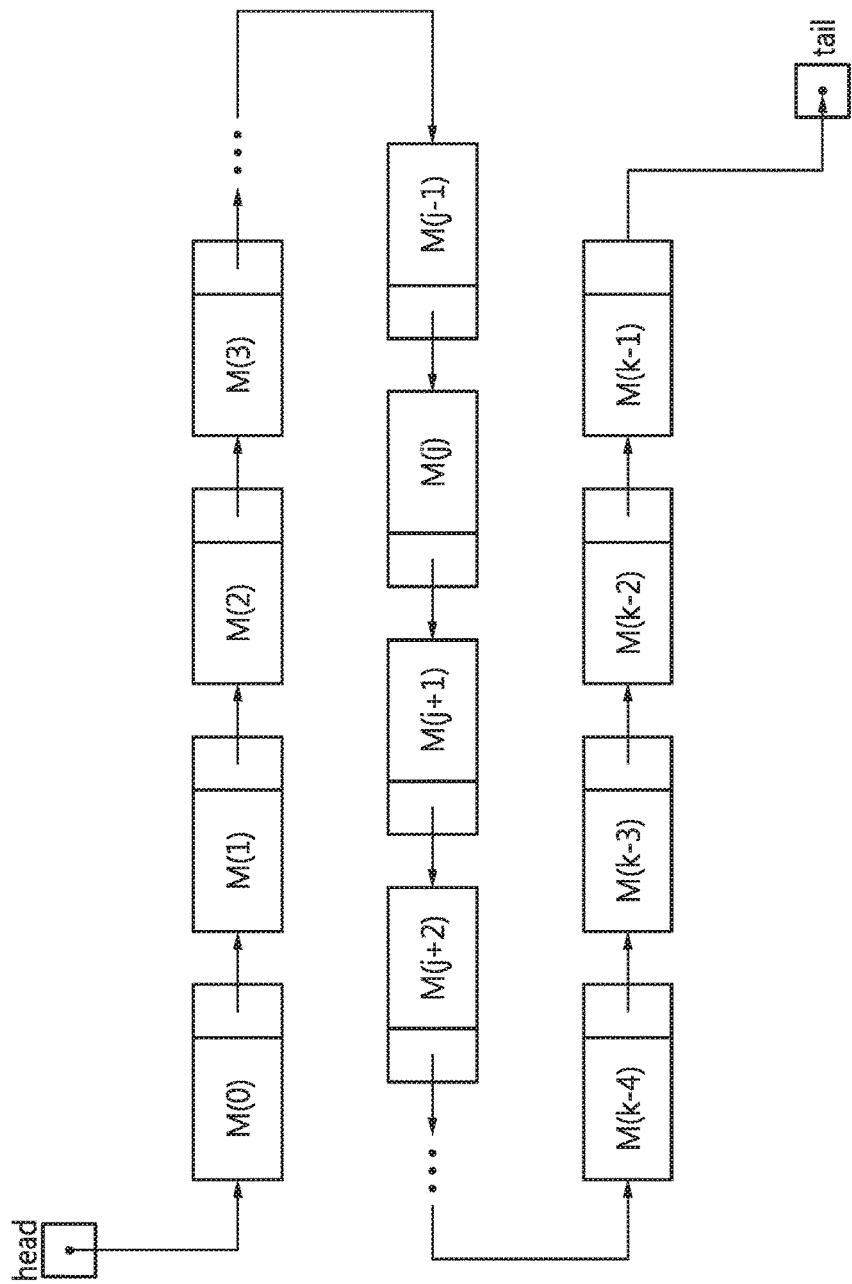
FIG. 9 is a diagram of a second data structure for managing meta data.

FIG. 8 is a diagram of the first data structure for managing the meta data. FIG. 9 is a diagram of the second data structure for managing the meta data. The first data structure may be a data structure for searching for the meta data having a particular structure member among a plurality of random meta data at a relatively high speed. The second data structure may be a data structure for erasing meta data which is the oldest one among the plurality of random meta data. The first data structure may be a hash table and the second data structure may be a free list.

Referring to FIG. 8, the hash table may store meta data M(0) through M(j−1) and M(j) through M(k−1) in a bucket. A hash key of the hash table may be a file location. The hash table may use chaining in order to avoid hash collision(s). Referring to FIG. 9, the free list may store the meta data M(0) through M(j−1) and M(j) through M(k−1) in order in which they are stored according to operation S106b. The free list may add the meta data to its tail in operation S106b. Referring to FIGS. 7 through 9, the meta data stored in the hash table and the free list may include structure members indicating a position in the hash table and a position in the free list.

When it is determined that the memory mapping is not the mapping of a file (i.e., in case of NO) in operation S104, the memory mapping is canceled in operation S108. The cancellation of the memory mapping may be performed by the CPU 110 at the request of the mapping controller 1001. The CPU 110 may cancel the memory mapping under the control of the OS. With the cancellation of the memory mapping, the memory mapping may be erased from the PT 132 in the nonvolatile main memory 130.

Consequently, in the memory mapping management method for a nonvolatile main memory system according to some example embodiments of the inventive concepts, when a memory mapping cancellation request is received and a memory mapping whose cancellation is requested is the mapping of a file, meta data relating to the memory mapping is separately stored in the memory mapping storage space 1004, so that the memory mapping whose cancellation is requested can be kept.

Figure 10:
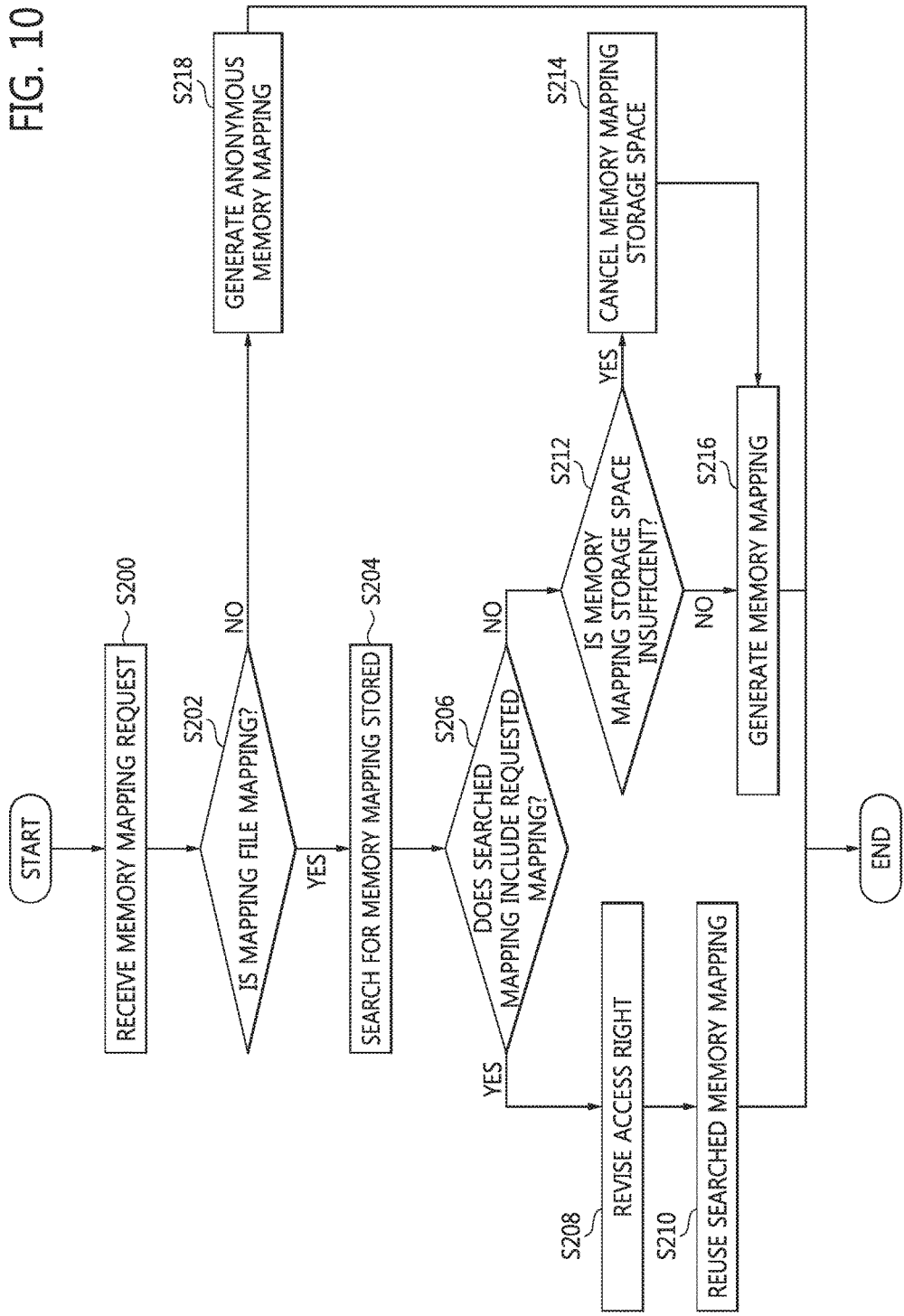
FIG. 10 is a flowchart of a memory mapping management method for a nonvolatile main memory system when there is a memory mapping request according to an example embodiment of the inventive concepts.

FIG. 10 is a flowchart of a memory mapping management method for the nonvolatile main memory system 10 when there is a memory mapping request according to an example embodiment of the inventive concepts. Referring to FIGS. 1, 5, and 10, the memory mapping request is received in operation S200.

The memory mapping request is a system call by a process and may be received by the I/F 1000. The I/F 1000 may receive the memory mapping request from the CPU 110. The memory mapping request may include arguments which may include address information of a virtual memory to be allocated in response to the memory mapping request, information about the size, the right and the mode of a memory mapping, a file descriptor of a target file of the memory mapping, and an offset value for starting the memory mapping in the descriptor. The memory mapping request is transmitted from the I/F 1000 to the determinator 1003 under the control of the mapping controller 1001.

Thereafter, whether the memory mapping is the mapping of a file may be determined in operation S202. The determination may be performed by the determinator 1003. The determinator 1003 may determine whether the memory mapping is the mapping of a file based on one of the arguments included in the memory mapping request under the control of the mapping controller 1001. For example, the determinator 1003 may determine whether the memory mapping is the mapping of the file based on information about the mode of the memory mapping among the arguments included in the memory mapping request.

When it is determined that the memory mapping is the mapping of a file (i.e., in case of YES) in operation S202, a memory mapping may be searched for a file, which is the same as the file determined in operation 202, in the memory mapping storage space 1004 in operation S204. For example, the search of the memory mapping may be performed by the search engine 1002 under the control of the mapping controller 1001. The search engine 1002 may search memory mappings in the memory mapping storage space 1004 to find the memory mapping of a file, which is the same as the file determined in operation S202.

As described above with reference to FIGS. 8 and 9, the memory mappings stored in the memory mapping storage space 1004 may be managed using the first data structure and the second data structure. The first data structure may be a hash table and the second data structure may be a free list. The search engine 1002 may use the first data structure to search for the memory mapping of the file in the memory mapping storage space 1004.

After operation S204, whether a region of the searched memory mapping in a virtual address space includes a region in the virtual address space requested by the memory mapping may be determined in operation S206. The determination may be performed by the determinator 1003 in operation S206. The region required by the requested memory mapping in the virtual address space may be determined using arguments included in the memory mapping request. The arguments may include address information of virtual memory to be allocated according to the memory mapping request and information about the size of the memory mapping. The region of the searched memory mapping in the virtual address space may be determined using a structure member included in meta data relating to the searched memory mapping.

Figure 11:
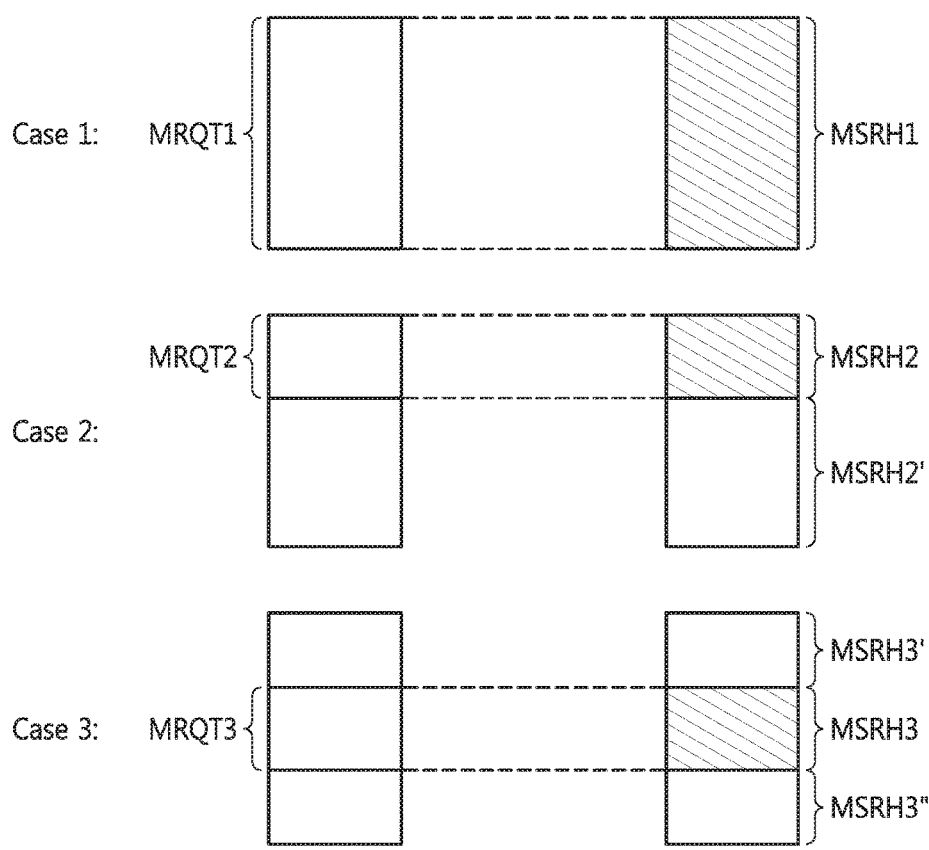
FIG. 11 is a diagram for explaining cases where a region of a searched memory mapping in a virtual address space includes a region which is required by a requested memory mapping in the virtual address space.

In operation S206, it is determined whether the region of the searched memory mapping in the virtual address space includes the region required by the requested memory mapping in the virtual address space. FIG. 11 is a diagram for explaining the cases where the region of the searched memory mapping in the virtual address space includes the region required by the requested memory mapping in the virtual address space.

In the first case shown in FIG. 11, a region MRQT1 required by the requested memory mapping in the virtual address space totally coincides with a region MSRH1 of the searched memory mapping in the virtual address space. In the second case shown in FIG. 11, a region MRQT2 required by the requested memory mapping in the virtual address space coincides with a part MSRH2 of a region MSRH2+MSRH2' of the searched memory mapping in the virtual address space. In the third case shown in FIG. 11, a region MRQT3 required by the requested memory mapping in the virtual address space coincides with a part MSRH3 of a region MSRH3'+MSRH3+MSRH3" of the searched memory mapping in the virtual address space. In other words, cases where the region of the searched memory mapping in the virtual address space may include the region required by the requested memory mapping in the virtual address space may include the first through third cases illustrated in FIG. 11.

When it is determined that the region of the searched memory mapping in the virtual address space includes the region required by the requested memory mapping in the virtual address space (i.e., in case of YES) in operation S206, an access right of the searched memory mapping may be revised to be the same as an access right of the requested memory mapping in operation S208. The revision of the access right may be performed by the mapping controller 1001 in operation S208. The access right may be read-only, write-only, execute-only, or a combination thereof. The mapping controller 1001 may revise a structure member representing the access right among the structure members of the meta data relating to the searched memory mapping so that the access right of the searched memory mapping is the same as the access right of the requested memory mapping.

Thereafter, the searched memory mapping is reused in operation S210. The reuse of the searched memory mapping may be performed by the mapping controller 1001. The mapping controller 1001 may transmit the meta data relating to the searched memory mapping to the CPU 110 through the I/F 1000. The reuse of the searched memory mapping will be described in detail with reference to FIGS. 7 and 11.

In the first case shown in FIG. 11, the region MRQT1 required by the requested memory mapping in the virtual address space entirely coincides with the region MSRH1 of the searched memory mapping in the virtual address space. In the second and third cases shown in FIG. 11, the regions MRQT2 and MRQT3 required by the requested memory mapping in the virtual address space coincide with the parts MSRH2 and MSRH3, respectively, of the regions MSRH2+MSRH2' and MSRH3'+MSRH3+MSRH3" of the searched memory mapping in the virtual address space. In such case, the searched memory mapping may be reused within a range in which the region of the searched memory mapping coincides with the region of the requested memory mapping in the virtual address space. For instance, the searched memory mappings MSRH1, MSRH2, and MSRH3 which coincide with the region of the requested memory mapping in the first through third cases may be reused.

When the region required by the requested memory mapping at least partially coincides with the region of the searched memory mapping in the virtual address space, the meta data of the searched memory mapping may be revised to have the same range as the region of the requested memory mapping in the virtual address space. For example, the meta data of the searched memory mapping may be revised by changing a start address and an end address in the virtual memory space among the structure members included in the meta data.

The searched memory mapping may be stored in the memory mapping storage space 1004 within a range in which the region of the searched memory mapping does not coincide with the region of the requested memory mapping in the virtual address space. For instance, in the second and third cases, the searched memory mappings MSRH2', MSRH3', and MSRH3" which do not coincide with the region of the requested memory mapping may be stored in the memory mapping storage space 1004.

For this operation, meta data the same as the meta data of the searched memory mapping may be generated. The generated meta data may be revised to have a range except for the region of the requested memory mapping in the virtual address space. The meta data of the searched memory mapping may be revised by changing a start address and an end address in the virtual memory space among structure members included in the meta data, which is the same as the meta data of the searched memory mapping.

Consequently, in the memory mapping management method for a nonvolatile main memory system according to the current example embodiment of the inventive concepts, when a memory mapping request is received and a requested memory mapping is the mapping of a file, a memory mapping stored in a memory mapping storage space can be reused, so that time and cost for generating the requested memory mapping can be saved.

When it is determined that the region of the searched memory mapping in the virtual address space does not include the region required by the requested memory mapping in the virtual address space (i.e., in case of NO) in operation S206, whether the memory mapping storage space 1004 is insufficient may be determined in operation S212. The determination may be performed by the determinator 1003 in operation S212. The maximum value of the memory mapping storage space 1004 may be predetermined for the memory mapping management method.

When it is determined that the memory mapping storage space 1004 is insufficient (i.e., in case of YES) in operation S212, the memory mapping storage space 1004 may be canceled in operation S214. The cancellation of the memory mapping storage space 1004 may be performed by the mapping controller 1001. The mapping controller 1001 may cancel meta data relating to a memory mapping stored in the memory mapping storage space 1004 to cancel the memory mapping storage space 1004.

The meta data to be cancelled may be selected by the search engine 1002 under the control of the mapping controller 1001. As described above with reference to FIGS. 8 and 9, the memory mapping stored in the memory mapping storage space 1004 may be managed using the first data structure and the second data structure. The first data structure may be a hash table and the second data structure may be a free list.

The search engine 1002 may use the second data structure to select the meta data to be cancelled. The meta data selected by the search engine 1002 may be the oldest one among the meta data relating to the memory mapping stored in the memory mapping storage space 1004. The mapping controller 1001 may release the meta data selected by the search engine 1002 from the first data structure and the second data structure.

Consequently, in the memory mapping management method for a nonvolatile main memory system according to the current example embodiment of the inventive concepts, when a memory mapping storage space is insufficient, the oldest meta data relating to the memory mapping is cancelled so that maintenance of meta data relating to the memory mapping stored in the memory mapping storage space is possible.

After operation S214, the requested memory mapping may be generated in operation S216. When it is determined that the memory mapping storage space 1004 is not insufficient (i.e., in case of NO) in operation S212, the requested memory mapping may also be generated in operation S216. The generation of the requested memory mapping may be performed by the CPU 110 at the request of the mapping controller 1001 in operation S216. The mapping controller 1001 may generate meta data relating to the requested memory mapping and send the meta data to the CPU 110. When a page fault occurs, the CPU 110 may generate the requested memory mapping using the meta data relating to the requested memory mapping under the control of the OS. The requested memory mapping may be stored in the PT 132 in the nonvolatile main memory 130.

When it is determined that the memory mapping is not the mapping of a file (i.e., in case of NO) in operation S202, an anonymous memory mapping may be generated in operation S218. The generation of the anonymous memory mapping may be performed by the CPU 110 at the request of the mapping controller 1001. The mapping controller 1001 may generate meta data relating to the anonymous memory mapping and send the meta data to the CPU 110. When a page fault occurs, the CPU 110 may generate the anonymous memory mapping using the meta data relating to the anonymous memory mapping under the control of the OS. The anonymous memory mapping may be stored in the PT 132 in the nonvolatile main memory 130.

Figure 12:
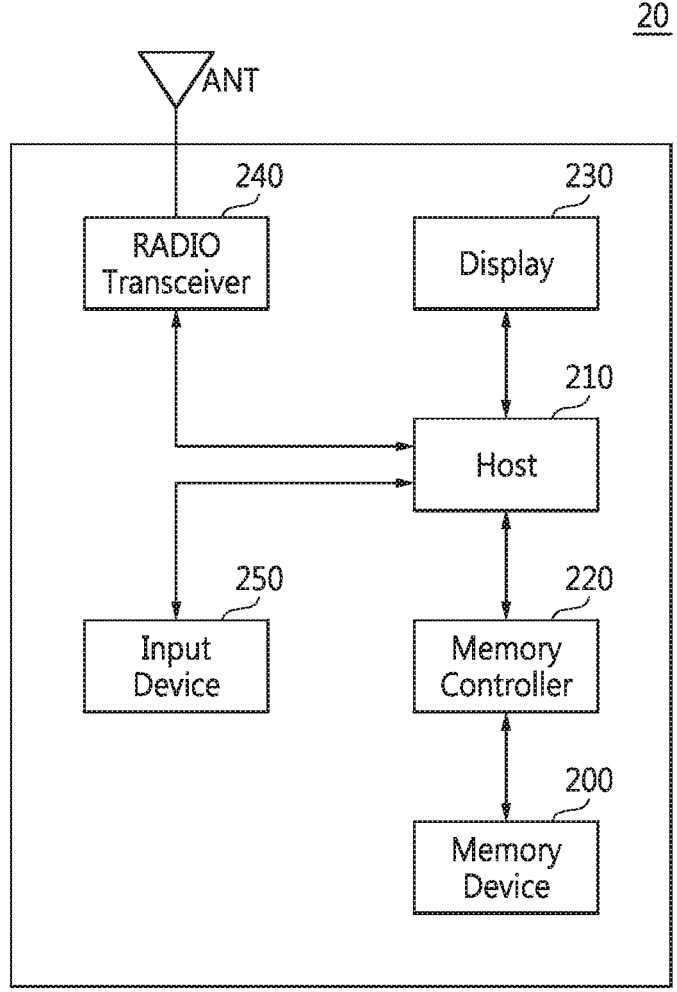
FIG. 12 is a block diagram of a system including the CPU and the nonvolatile main memory illustrated in FIG. 1 according to an example embodiment of the inventive concepts.

FIG. 12 is a block diagram of a system 20 including the CPU and the nonvolatile main memory illustrated in FIG. 1 according to an example embodiment of the inventive concepts.

Referring to FIGS. 1 and 12, the system 20 may be implemented as a cellular phone, a smart phone, or a tablet personal computer (PC).

The system 20 includes a host 210 and a memory device 200. The memory device 200 may be the memory device 130 illustrated in FIG. 1.

According to some example embodiments, the host 210 and the memory device 200 may be packaged in a single package. In this case, the package may be mounted on the system board (not shown).

The system 20 includes a memory controller 220 that can control, for example, the test operation of the memory device 200 and the data processing operation of the memory device 200, for example, a write operation or a read operation.

The memory controller 220 may be controlled by the host 210, which controls the overall operation of the system 20. The memory controller 220 may be connected between the host 210 and the memory device 200.

The data in the memory device 200 may be displayed through a display 230 according to the control of the host 210.

A radio transceiver 240 transmits or receives radio signals through an antenna ANT. The radio transceiver 240 may convert radio signals received through the antenna ANT into signals that can be processed by the host 210. Accordingly, the host 210 may process the signals output from the radio transceiver 240 and store the processed signals in the memory device 200 or display the processed signals through the display 230.

The radio transceiver 240 may also convert signals output from the host 210 into radio signals and outputs the radio signals to an external device through the antenna ANT.

An input device 250 enables control signals for controlling the operation of the host 210 or data to be processed by the host 210 to be input to the system 20. The input device 250 may be implemented by a pointing device such as a touch pad or a computer mouse, a keypad, or a keyboard.

The host 210 may control the operation of the display 230 to display data output from the memory device 200, data output from the radio transceiver 240, or data output from the input device 250.

Figure 13:
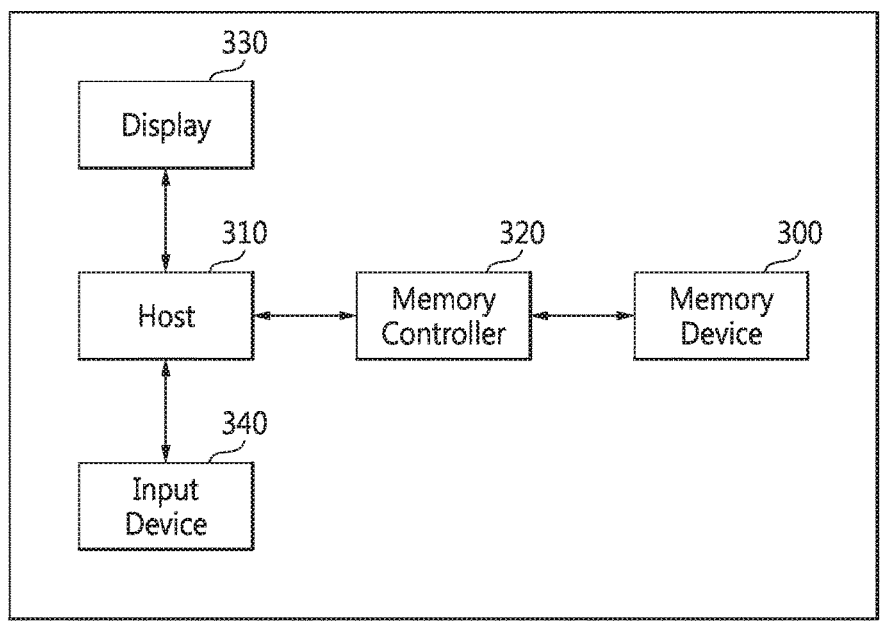
FIG. 13 is a block diagram of a system including the CPU and the nonvolatile main memory illustrated in FIG. 1 according to an example embodiment of the inventive concepts.

FIG. 13 is a block diagram of a system 30 including the CPU and the nonvolatile main memory illustrated in FIG. 1 according to an example embodiment of the inventive concepts. The system 30 may be implemented as a personal computer (PC), a tablet PC, a netbook, an e-reader, a personal digital assistant (PDA), a portable multimedia player (PMP), an MP3 player, or an MP4 player.

The system 30 includes a host 310 for controlling the overall operation of the system 30 and the memory device 300. The memory device 300 may be the memory device 130 illustrated in FIG. 1.

According to some example embodiments, the host 310 and the memory device 300 may be packaged in a single package. In this case, the package may be mounted on the system board (not shown).

The system 30 may include a memory controller 320 for controlling the operation of the memory device 300. The memory controller 320 may be the memory controller 140 illustrated in FIG. 1.

The host 310 may display data stored in the memory device 300 through the display 330 according to data input through the input device 340. The input device 340 may be implemented by a pointing device such as a touch pad or a computer mouse, a keypad, or a keyboard.

Figure 14:
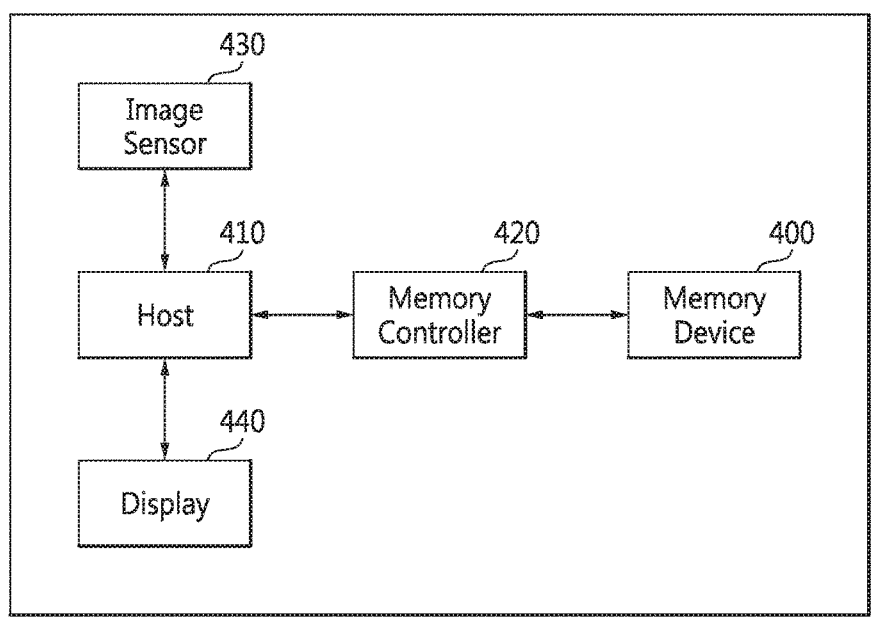
FIG. 14 is a block diagram of a system including the CPU and the nonvolatile main memory illustrated in FIG. 1 according to an example embodiment of the inventive concepts.

FIG. 14 is a block diagram of a system 40 including the CPU and the nonvolatile main memory illustrated in FIG. 1 according to an example embodiment of the inventive concepts. The system 40 may be implemented as an image processing device like a digital camera, a cellular phone equipped with a digital camera, or a smart phone equipped with a digital camera.

The system 40 includes a host 410, the memory device 400 and a memory controller 420 controlling the data processing operations, such as a write operation or a read operation, of the memory device 400. The system 40 further includes an image sensor 430 and a display 440.

The image sensor 430 included in the system 40 converts optical images into digital signals and outputs the digital signals to the host 410 or the memory controller 420. The digital signals may be controlled by the host 410 to be displayed through the display 440 or stored in the memory device 400 through the memory controller 420.

Data stored in the memory device 400 may be displayed through the display 440 according to the control of the host 410 or the memory controller 420. The memory controller 420, which may control the operations of the memory device 400, may be implemented as a part of the host 410 or as a separate chip.

Figure 15:
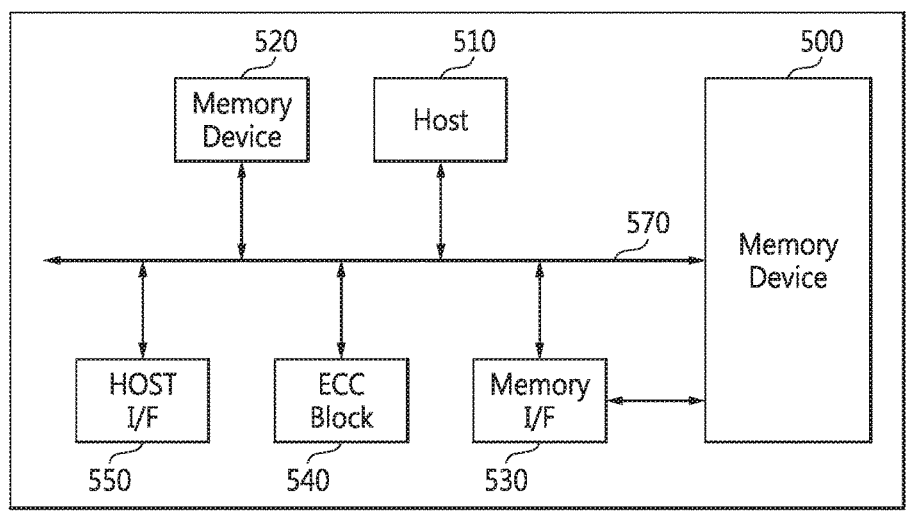
FIG. 15 is a block diagram of a system including the CPU and the nonvolatile main memory illustrated in FIG. 1 according to an example embodiment of the inventive concepts.

FIG. 15 is a block diagram of a system 50 including the CPU and the nonvolatile main memory illustrated in FIG. 1 according to an example embodiment of the inventive concepts. The system 50 includes the memory device 520 and a host 510 controlling the operations of the memory device 520. The memory device 520 may be implemented by nonvolatile memory such as a flash memory.

The system 50 may include a system memory 500, a memory interface 530, an error correction code (ECC) block 540, and a host interface 550.

The system memory 500 may be used an operation memory of the host 510. The system memory 500 may be implemented by, for example, a non-volatile memory like read-only memory (ROM) or a volatile memory like static random access memory (SRAM).

The host 510 connected with the system 50 may perform data communication with the memory device 520 through the memory interface 530 and the host interface 550.

The ECC block 540 may be controlled by the host 510 to detect an error bit included in data output from the memory device 520 through the memory interface 530, correct the error bit, and transmit the error-corrected data to the host 510 through the host interface 550. The host 510 may control data communication among the memory interface 530, the ECC block 540, the host interface 550, and the memory device 520 through a bus 570. The system 50 may be implemented as a flash memory drive, a USB memory drive, an IC-USB memory drive, or a memory stick.

As described above, in a memory mapping management method according to some example embodiments of the inventive concepts, meta data relating to a memory mapping may be separately stored in a memory mapping storage space when a memory mapping cancellation request is received and the memory mapping whose cancellation is requested is the mapping of a file so that the memory mapping whose cancellation is requested can be kept or maintained. In addition, when a memory mapping request is received and a memory mapping requested is the mapping of a file, the memory mapping stored in the memory mapping storage space may be reused so that time and cost for generating the requested memory mapping can be saved. Further, when the memory mapping storage space is insufficient, the oldest meta data among meta data relating to the memory mapping may be cancelled so that meta data relating to the memory mapping stored in the memory mapping storage space can be kept or maintained.

While the inventive concepts have been particularly shown and described with reference to some example embodiments thereof, it will be understood by those of ordinary skill in the art that various changes in forms and details may be made therein without departing from the spirit and scope of the inventive concepts as defined by the following claims.

What is claimed is:

1. A memory mapping management method for a nonvolatile main memory system which uses nonvolatile memory as main memory, the memory mapping management method comprising:
   receiving a request to cancel a memory mapping;
   determining, in response to receiving the request, whether the memory mapping is a mapping of a file based on meta data relating to the memory mapping; and
   separately storing the meta data in response to a result of the determining indicating that the memory mapping is the mapping of the file.

2. The memory mapping management method of claim 1, wherein the separately storing the meta data comprises:
   adding the meta data to a first data structure; and
   adding the meta data to a second data structure.

3. The memory mapping management method of claim 2, further comprising:
   revising an access right to the meta data before the separately storing the meta data.

4. The memory mapping management method of claim 2, wherein the first data structure is a hash table and the second data structure is a free list.

5. The memory mapping management method of claim 2, wherein the first data structure and the second data structure are separately stored in a cache.

6. The memory mapping management method of claim 1, wherein the meta data has a data structure which is provided by an operating system for virtual memory management.

7. A memory mapping management method for a nonvolatile main memory system which uses nonvolatile memory as main memory, the memory mapping management method comprising:
   receiving a memory mapping request;
   searching for a memory mapping for a file in a memory mapping storage space in response to a requested memory mapping being a mapping of the file;
   reusing a searched memory mapping found during the search in response to a region of the searched memory mapping including a region required by the requested memory mapping in a virtual address space;
   determining whether the memory mapping storage space is insufficient in response to the region of the searched memory mapping not including the region required by the requested memory mapping in the virtual address space; and
   generating the requested memory mapping in response to the determining determining that the memory mapping storage space is not insufficient.

8. The memory mapping management method of claim 7, further comprising:
   revising an access right of the searched memory mapping to be same as an access right of the requested memory mapping in response to the region of the searched memory mapping including the region required by the requested memory mapping in the virtual address space,
   wherein the reusing a searched memory mapping includes determining whether the region of the searched memory mapping includes the region required by the requested memory mapping in the virtual address space.

9. The memory mapping management method of claim 7, further comprising:
   cancelling the memory mapping in response to the memory mapping storage space being insufficient.

10. The memory mapping management method of claim 7, further comprising:
    generating an anonymous memory mapping in response to the requested memory mapping not being the mapping of the file,
    wherein the searching for a memory mapping for a file in a memory mapping storage space includes determining whether the requested memory mapping is the mapping of the file.

11. The memory mapping management method of claim 7, wherein the reusing a searched memory mapping comprises:
    reusing the searched memory mapping in response to the region required by the requested memory mapping entirely coinciding with the region of the searched memory mapping in the virtual address space; and
    reusing the searched memory mapping in a range in which the region of the searched memory mapping coincides with the region of the requested memory mapping in the virtual address space in response to the region required by the requested memory mapping partially coinciding with the region of the searched memory mapping in the virtual address space.

12. The memory mapping management method of claim 11, wherein meta data of the searched memory mapping is revised to have the same range as the region of the requested memory mapping in the virtual address space in response to the region required by the requested memory mapping at least partially coinciding with the region of the searched memory mapping in the virtual address space.

13. The memory mapping management method of claim 12, wherein the meta data of the searched memory mapping is revised by changing a start address and an end address in the virtual address space among structure members, which are included in the meta data of the searched memory mapping.

14. The memory mapping management method of claim 7, wherein the nonvolatile memory comprises a memory cell array and the memory cell array comprises three-dimensional memory cells.

15. The memory mapping management method of claim 1, further comprising:
    cancelling the memory mapping in response to the result of the determining indicating that the memory mapping is not the mapping of the file.

16. A memory mapping management method for a nonvolatile main memory system which uses nonvolatile memory as main memory, the memory mapping management method comprising:

a first management operation including,
    receiving a first memory mapping request,
    accessing a memory mapping for a file in a memory mapping storage space in response to a requested memory mapping being a mapping of the file, and
    reusing the accessed memory mapping in response to a region of the accessed memory mapping including a region required by the requested memory mapping in a virtual address space; and
a second management operation including,
    receiving a cancel request to cancel a second memory mapping,
    determining, in response to receiving the cancel request, whether the second memory mapping is a mapping of a file based on meta data relating to the second memory mapping,
    separately storing the meta data to have a first data structure and a second data structure in response to a result of the determining indicating that the second memory mapping is the mapping of the file, the second data structure being different from the first data structure, and
    cancelling the second memory mapping in response to the result of the determining indicating that the second memory mapping is not the mapping of the file.

17. The memory mapping management method of claim 16, wherein the first management operation further includes, revising an access right of the accessed memory mapping to be the same as an access right of the requested memory mapping in response to the region of the accessed memory mapping including the region required by the requested memory mapping in the virtual address space.

18. The memory mapping management method of claim 16, further comprising:
    determining whether the memory mapping storage space is insufficient in response to the region of the accessed memory mapping not including the region required by the requested memory mapping in the virtual address space;
    cancelling the memory mapping in response to the determining that the memory mapping storage space is insufficient; and
    generating the requested memory mapping in response to the determining determining that the memory mapping storage space is not insufficient.

19. The memory mapping management method of claim 16, further comprising:
    generating an anonymous memory mapping in response to the requested memory mapping not being the mapping of the file.

20. The memory mapping management method of claim 16, wherein the second management operation further includes revising an access right to the meta data before the storing the meta data.

* * * * *